United States Patent [19]

Ormond

[11] 3,960,013

[45] June 1, 1976

[54] PLATFORM LOAD CELL

[76] Inventor: Alfred Newman Ormond, 11969 E. Rivera Road, Santa Fe Springs, Calif. 90670

[22] Filed: Mar. 4, 1975

[21] Appl. No.: 555,141

[52] U.S. Cl. ............................. 73/141 A; 177/211
[51] Int. Cl.² ........................................ G01L 1/22
[58] Field of Search .................. 73/141 A; 177/211

[56] References Cited
UNITED STATES PATENTS

| | | | |
|---|---|---|---|
| 3,272,006 | 9/1966 | Eckard .............................. | 73/141 A |
| 3,706,349 | 12/1972 | Paelian et al. ...................... | 177/211 |
| 3,771,359 | 11/1973 | Shuberg ............................ | 73/141 A |

*Primary Examiner*—Charles A. Ruehl
*Attorney, Agent, or Firm*—Ralph B. Pastoriza

[57] ABSTRACT

The load cell comprises a flat disc having an inner portion and outer ring integrally connected together by flexure webs at spaced circumferential points, the disc having holes drilled in its side to enable the sensitivity of strain gauges secured to the webs to be equalized. Upper and lower flat diaphragms sandwich the disc, the diaphragms being secured only to the top and bottom surfaces of the outer ring and to central areas of the inner portion. A platform above the upper diaphragm is secured to a central portion of this diaphragm. The assembly is completed by a circular base supporting the under peripheral portion of the lower diaphragm. The strain gauges attached to the flexure webs provide signals upon axial movement of the inner portion relative to the outer ring in response to a weight or load on the platform. The diaphragms constrain the movement to a vertical axial direction and function to completely isolate the vertical load from side force components and moments resuting from any-off-center loading of the platform.

5 Claims, 5 Drawing Figures

PLATFORM LOAD CELL

This invention relates to load cells and more particularly to a specially designed load cell to serve as a platform weighing scale in conjunction with strain gauges providing an output signal constituting a function of a load on the platform to be weighed.

BACKGROUND OF THE INVENTION

Platform weighing scales incorporating strain gauges have been proposed for providing an electrical readout which is a function of a weight placed on the platform. One problem associated with all such devices is to provide a load cell structure wherein the strain sensitive flexure webs are not subject to side force loads or moments created as a consequence of off-center positioning of a load on the scale platform. Another problem has to do with the individual sensitivities of the strain gauges and associated flexure webs. If these sensitivities are not equal, off-center loading wherein the load is physically closer to one flexure than another will result in a different output signal than center loading. Once these problems are solved, there can be provided a truly accurate weighing scale in which the output signal is a function substantially solely of the vertical weight component of any object placed on the scale, regardless of its position on or off center.

BRIEF DESCRIPTION OF THE PRESENT INVENTION

With the foregoing in mind, the present invention contemplates a spefcifically designed load cell particularly useful for a platform weighing scale wherein output signals are developed from strain gauges in the load cell which are truly functions only of the vertical load components even though the object to be weighed may be positioned off center on the platform and wherein means are provided to equalize the sensitivities of the load cell strain gauges.

More particularly, in accord with the invention the load cell comprises a flat disc having an inner portion and outer ring integrally connected together by a flexure web at spaced circumferential points. Upper and lower flat diaphragms in turn sandwich the disc therebetween and are secured to the top and bottom surfaces of the outer ring and to top and bottom central areas only of the inner portion of the disc.

A platform is disposed above the upper diaphragm and secured to the central portion of this upper diaphragm and a circular base in turn supports the under peripheral portion of the lower diaphragm. Strain gauges secured to the flexure webs will then provide signals constituting functions only of a vertical axial loading displacing the inner portion relative to the outer ring of the disc, the diaphragms themselves constraining this movement to a vertical axial direction so that side force components and moments are completely isolated from the measured load by the diaphragms.

The individual sensitivities of the strain gauges and associated flexure webs are equalized to assure a consistent output signal even if the load is off center.

BRIEF DESCRIPTION OF THE DRAWINGS

A better understanding of the invention will be had by referring to the accompanying drawings in which.

DETAILED DESCRIPTION OF THE INVENTION

Figure 1:
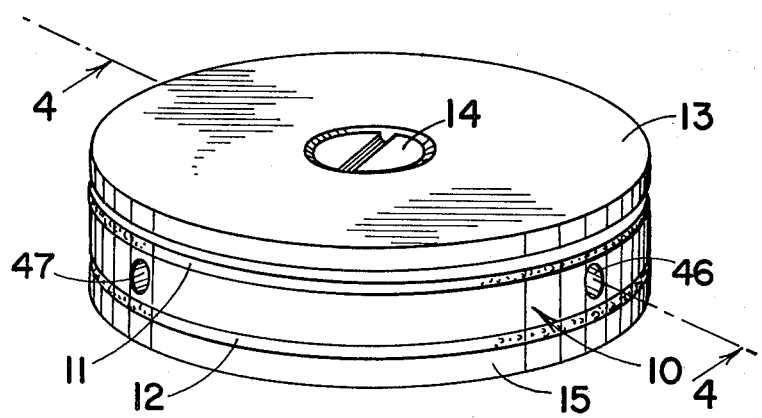
FIG. 1 is a perspective view of a platform load cell in accord with the present invention.

Referring to FIG. 1, the platform load cell includes a solid flat disc member 10 with upper and lower flat diaphragms 11 and 12 sandwiching the disc therebetween as shown. A platform 13 is shown above the upper diaphragm 11 and is secured to the central portion of this diaphragm as by a screw 14.

The basis assembly is completed by the provision of a circular base 15 which engages the under peripheral portion of the lower diaphragm 12.

Figure 2:
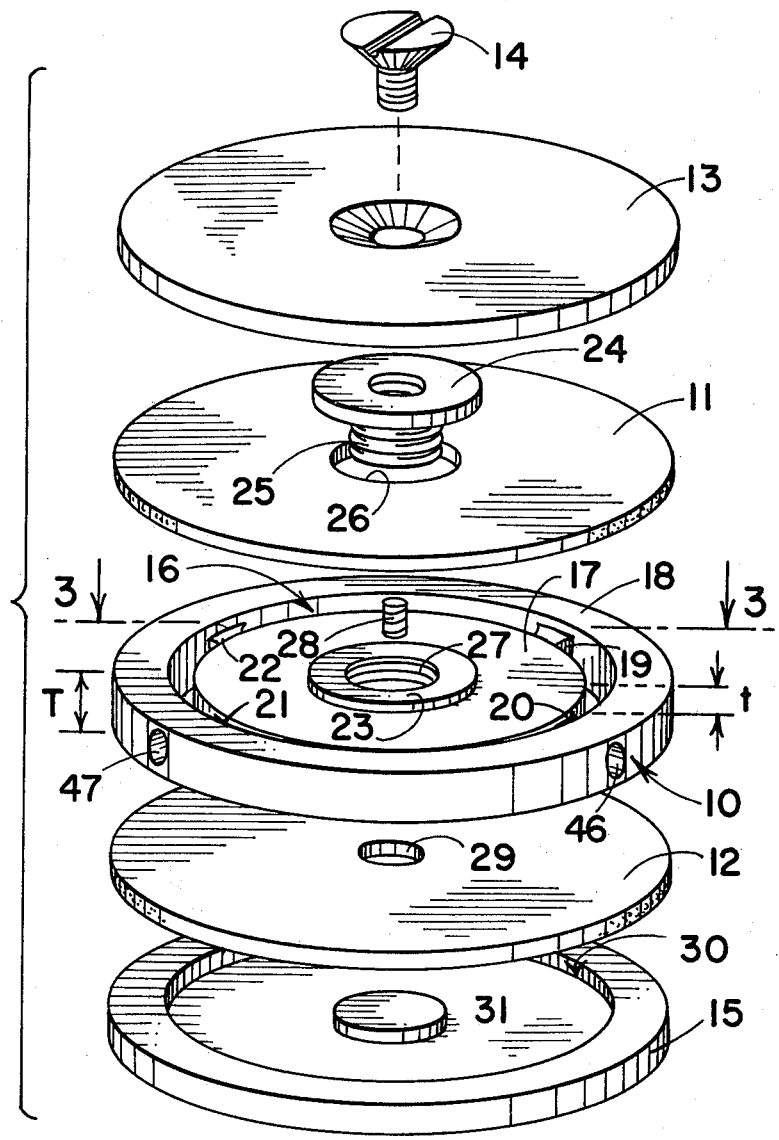
FIG. 2 is a perspective exploded view of the various elements making up the load cell of FIG. 1.

Referring to the exploded view of FIG. 2, further details will be evident. Referring first to the solid flat disc member 10, it will be noted that this member has a thickness T substantially less than its diameter and includes an annular channel 16 cut through the disc adjacent to its periphery to define an inner portion 17 and an outer ring 18.

In cutting the channel, there are four points circumferentially spaced at 90° wherein the channel is only partially cut in from opposite sides of the disc to leave flexure webs integrally connecting the inner portions 17 of the disc to its peripheral portion 18 at each of the four points. These four flexure webs are partially visible in FIG. 2 and are shown at 19, 20, 21 and 22.

The inner portion 17 of the disc has its upper and lower flat surfaces recessed except for a central area 23 so that its thickness at points other than the central area is less than the given thickness of the disc. This latter thickness of the central portion is indicated by the letter t in FIG. 2.

Referring now to the platform 13, it will be noted that the fastening screw 14 is arranged to be received in a central opening in the platform and thread into a double threaded insert 24 positioned between the upper diaphragm 11 and the central underside area of the platform. This insert 24 includes exterior threads 25 arranged to pass through an opening 26 in the upper diaphragm 11 and be threadedly received in threaded opening 27 of the central area 23 on the inner portion 17 of the disc 10.

An adjustable stop means includes a small screw 28 shown exploded above the threaded opening 27 of the disc 10, which screw extends through an opening 29 in the lower diaphragm 12 when the various elements are assembled.

The circular base member 15 includes a circular cavity 30 of diameter greater than the outside diameter of the inner portion 17 of the disc 10 such that it will engage only the bottom peripheral portion of the lower circular diaphragm 12. As shown, this cavity 30 includes a central raised portion 31 which is positioned juxtaposed the end of the stop crew 28 when the elements are assembled.

Figure 3:
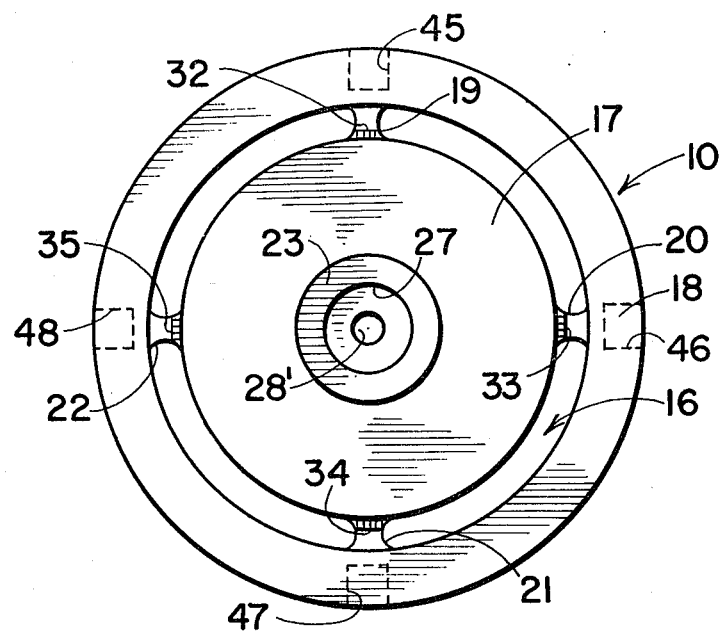
FIG. 3 is a top plan view of one of the elements of FIG. 2 taken in the direction of the arrows 3—3.

Referring now to the plan view of FIG. 3, the geometry of the disc member 10 can better be appreciated. It will be noted that the various flexure webs 19, 20, 21 and 22 extend essentially in a radial direction between the inner portion 17 and outer periphery 18 of the disc 10. Suitable strain gauge means are indicated by the lines 32, 33, 34, and 35 on the upper surfaces of these flexure webs. Additional strain gauges are provided on the bottom surfaces of the webs. There is also visible in FIG. 3 a small central threaded opening 28' arranged to threadedly receive the stop screw 28 described in FIG. 2.

Figure 4:
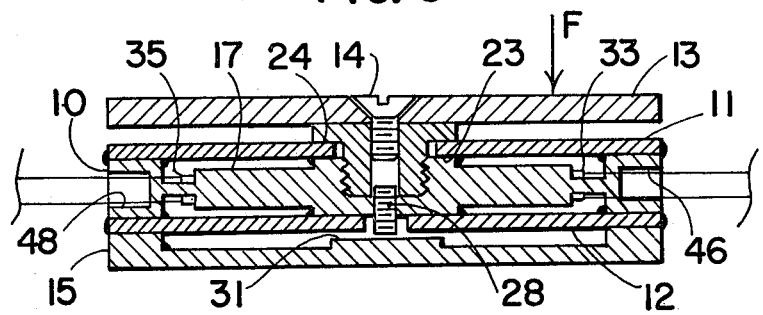
FIG. 4 is a cross section of the load cell taken in the direction of the arrows 4—4 of FIG. 1; and, FIG. 5 is a top plan view of a modified construction of one of the elements of the load cell.

In FIG. 4, the various elements described in conjunction with FIGS. 1 and 2 are shown in completely assembled relationship. Because of the recessed top and bottom surfaces of the inner portion 17 of the disc 10 there are left gaps between these surface portions and the diaphragms 11 and 12. The central area 23 on the top of the inner portion 17 which is not recessed is coplanar with the top surface of the periphery of the disc 10 so that the upper diaphragm 11 is engaged completely about its bottom periphery by the periphery of the disc and at its central area by the area 23. This central area of the inner portion 17 is secured rigidly to the central portion of the diaphragm and also the underside of the central area of the platform 13 by the insert 24 described in FIG. 2.

The underside of the inner portion 17 similarly includes an unrecessed central area which engages the top central portion of the lower diaphragm 12. In FIG. 4, the stop screw 28 is shown in position with its lower end spaced a given distance from the raised portion 31 on the circular base 15. By adjusting the threaded extent of the screw 28 the spacing of its end from the raised portion 31 will vary the axial distance through which the inner portion 17 can move in a vertical direction before engaging the stop.

Strain gauges similar to the gauges 33 and 35 are provided on the underside of the flexure webs as described and as shown in FIG. 4, suitable electrical leads from these gauges extending laterally from the structure.

The diaphragms and disc as well as the circular base may be secured together by any suitable means such as welding at the edges as indicated or by screws.

Figure 5:
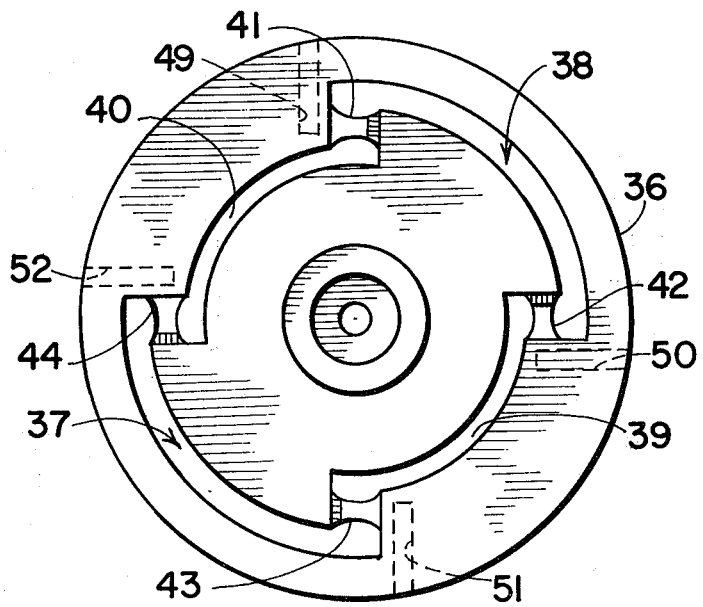

Referring now to FIG. 5, there is shown a modified construction of the basic disc which could be used in place of the disc 10 described in FIG. 1 through 4. As shown in the plan view, the modified disc is designated 36 and includes an annular channel cut through the disc but wherein diagonally opposite quadrants of the channel such as indicated at 37 and 38 are of greater diameter than the remaining quadrants 39 and 40.

With the foregoing arrangement, the flexure webs are defined at points where the quadrants meet so as to extend in circumferential directions between the inner portion and periphery of the disc 36. These flexure webs are indicated at 41, 42, 43 and 44 and are provided with top and bottom strain gauges as described in conjunction with the flexure webs shown in FIGS. 3 and 4.

The remaining portions of the disc 36 are the same as the disc 10 described in FIGS. 1 through 4 and the same is sandwiched between the upper and lower diaphragms as described in conjunction with the disc 10.

In each of the embodiments described, it is important that the sensitivities of each of the flexure webs and associated strain gauges be the same as otherwise a different output signal results when the load on the platform is shifted to different locations on the platform.

In order to equalize these sensitivities, the individual sensitivities can be varied by drilling holes in the outer ring portion or periphery of the disc to remove material adjacent to the points of connection of the flexure webs to the outer ring portion or periphery of the disc. This material removal essentially decreases the fixity of the webs at these points thereby changing their bending characteristics and thus changing the sensitivity of the strain gauge output signals.

Such holes are shown at 45, 46, 47 and 48 for the disc of FIGS. 3 and 4 and at 49, 50, 51, and 52 for the disc of FIG. 5. By independently varying the depths of the holes the sensitivities can be independently varied until all are equalized.

OPERATION

In operation, a product to be weighed or any other suitable type load is positioned on the top of the platform 13. Referring particularly to FIG. 4, the vertical arrow F represents such a load and it will be noted that it is off center. Nevertheless, the vertical component of this load will be transmitted to the inner portion 17 of the disc 10 which will be constrained to move in a vertical axial direction by the upper and lower diaphragms 11 and 12.

As a consequence of the foregoing, signals developed by the strain gauges such as 33 and 35 will constitute a function only of this vertical load component. Any side force components or moments created as a consequence of the off-center loading will be substantially completely isolated by the upper and lower diaphragms 11 and 12.

In both of the embodiments of FIGS. 4 and 5, the top strain gauges will be in compression and the bottom strain gauges in tension when the inner portion moves downwardly relative to the peripheral portion of the disc. These respective strain gauges accordingly are connected into opposite arms of a bridge circuit in a well known manner to provide an output signal constituting a function of the strains developed in the flexure webs. As mentioned, because of the constraining of movement to a vertical axial direction, side force components and moments are isolated so that the resulting reading of the generated signals provide an accurate indication of the vertical force component or weight of an object placed on the platform.

In the drawings, the vertical thickness of the various components relative to their diameters have been greatly exaggerated simply for purposes of clarity. In an actual embodiment, the ratio of the thickness T of the disc to its diameter is of the order of 1 to 10. If the thickness T is taken as a unit, the thickness of each of the diaphragms would be of the order of 1/20 of this thickness T while the depth of the recess of the top and bottom surfaces of the inner portion of the disc would be slightly less than 1/20 the thickness T. On the same scale, the thickness of the flexure webs would be about ⅛ the thickness T.

The stop means in the form of the screw 28 described in FIG. 4 is adjusted to limit the downward relative movement of the inner portion to the periphery of the disc so as to avoid damaging the flexure webs. This limiting distance would be substantially less than 1/20 of the thickness T.

By drilling the various holes 45 through 48 and 49 through 52 of proper depth, the sensitivities of the strain gauges and associated webs can all be equalized to assure that the output signal from the bridge will be the same regardless of the position of the applied load F; that is, on center or off center.

What is claimed is:

1. A platform load cell comprising, in combination:
   a. a flat disc having an inner portion and outer ring integrally connected together by flexure webs at spaced circumferential points;
   b. upper and lower flat diaphragms sandwiching said disc therebetween secured only to the top and bottom surfaces of the outer ring and top and bottom central areas of the inner portion;
   c. a platform above the upper diaphragm and secured to a central portion thereof;
   d. a circular base supporting the under peripheral portion of the lower diaphragm;
   e. strain gauge means on said flexure webs, said diaphragms constraining movement of said inner portion relative to said outer ring to a vertical axial direction so that output signals from said strain gauges constitute a function only of the vertical load component of a load placed on said platform, side forces and moments resulting from off-center loading on said platform being isolated by said diaphragms; and,
   f. means in said flat disc for equalizing the sensitivity of the several strain gauge means and associated flexure webs in the form of holes drilled into said outer ring to remove material adjacent to the points of connection of the flexure webs to the outer ring to thereby decrease the fixity of the webs at said points and thereby vary the sensitivity of the webs and associated strain gauges, the depth of said holes being adjusted to values at which the sensitivities of all the webs and associated strain gauges are equal.

2. A platform load cell comprising, in combination:
   a. a sold flat disc member of given thickness substantially less than its diameter having an annular channel cut through the disc adjacent to its periphery except at four points circumferentially spaced at 90° wherein the channel is only partially cut in from opposite sides of the disc to leave a flexure web integrally connecting the inner portion of the disc to its periphery at each of said four points, said inner portion having its upper and lower flat surfaces recessed except for a central area so that its thickness at points other than said central area is less than said given thickness;
   b. upper and lower circular diaphragms secured to the upper and lower peripheral portions of said disc and to said central area to sandwich said disc therebetween;
   c. a platform above the upper diaphragm secured to the central portion of said upper diaphragm;
   d. a circular base of diameter corresponding to said disc having a circular cavity of diameter greater than the outside diameter of said inner portion engaging the bottom peripheral portion of the lower circular diaphragm; and,
   e. strain gauges secured to each flexure web whereby the vertical component of any load on said platform is transmitted to said inner portion of said disc in only a vertical axial direction to flex said flexure webs and provide a signal from said strain gauges constituting a function of said load, said upper and lower diaphragms constraining movement of said inner portion to said axial direction, any side load components or moments generated by off-center loading on said platform being isolated from the load in said vertical axial direction by said diaphragms, said disc having holes drilled into its side to remove material adjacent to the points of connection of the flexure webs to the periphery of said disc to thereby decrease the fixity of the webs at said points and thereby vary the sensitivity of the webs and associated strain gauges, the depth of said holes being adjusted to values at which the sensitivities of all the webs and associated strain gauges are equal.

3. A load cell according to claim 2, in which said flexure webs extend in a radial direction between said inner portion and the periphery of said disc.

4. A load cell according to claim 2, in which said channel has opposite quadrants of greater diameter than the remaining quadrants, the flexure web being defined at points where the quadrants meet so as to extend in circumferential directions between said inner portion and the periphery of said disc.

5. A load cell according to claim 2, including a raised area defining stop means at the central portion of the cavity in said circular base to limit the movement of said inner portion of said disc in said vertical axial direction.

* * * * *